May 8, 1928.

P. F. VICTOR

AUTOMOBILE HEATER

Filed Dec. 11, 1926

1,669,222

Inventor:
Paul F. Victor.
By A. Milian Redfield, Atty.

Patented May 8, 1928.

1,669,222

UNITED STATES PATENT OFFICE.

PAUL F. VICTOR, OF CHICAGO, ILLINOIS.

AUTOMOBILE HEATER.

Application filed December 11, 1926. Serial No. 154,070.

My invention relates to heating devices and more particularly to automobile heaters.

One of the objects of my invention is to provide a simple, practical and inexpensive heating device.

Another object of my invention is to provide a more efficient heater than has been known.

A further object is to provide a heater requiring a minimum of space and adapted to use in an automobile.

A further object is to use more efficiently, the exhaust gases of an automobile for heating.

A further object is to provide a heater that will not leak gas nor emit odors.

Other objects and advantages of my invention will appear and be brought out in the following specification and drawings in which.

Figure 1:
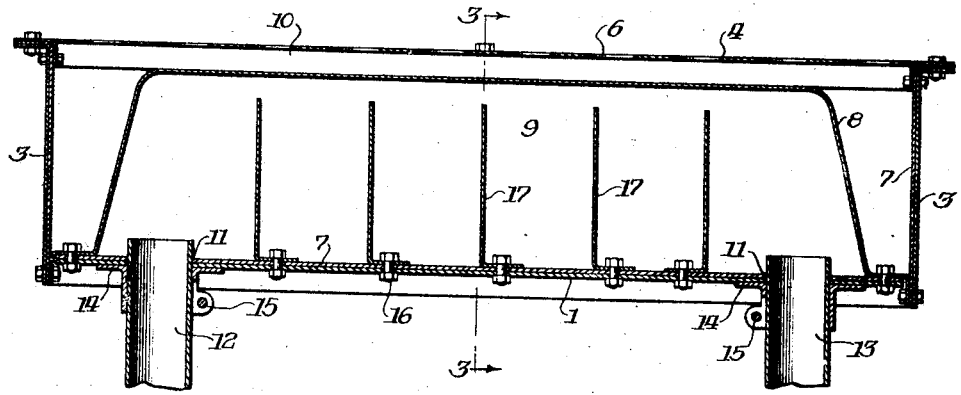
Fig. 1 is a central sectional side elevation of an embodiment of the invention.
Figure 2:
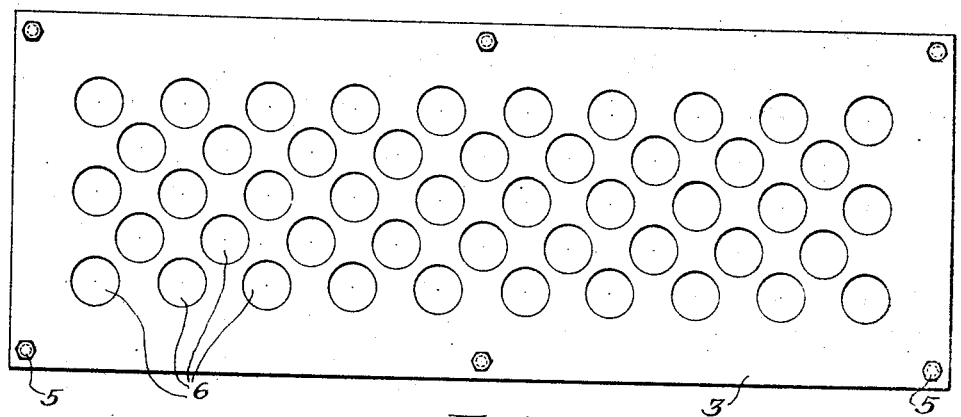
Fig. 2 is a top view of the same.
Figure 3:
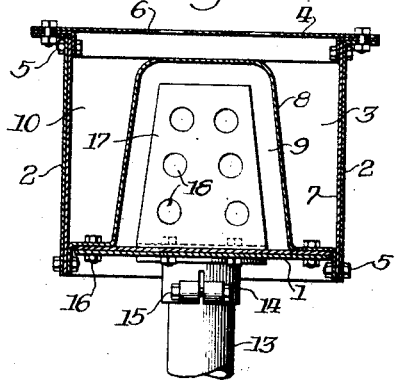
Fig. 3 is a cross sectional elevation taken along line 3—3 of Fig. 1.

Referring more particularly to the drawings, I show a heater having a bottom 1, sides 2, ends 3 and top 4, all securely fastened together as by bolts 5, and preferably made of metal.

Top 4 is provided with apertures 6 through which the heat may be given out while the bottom 1, sides 2 and ends 3 are covered on the inside with a layer 7 of non-conducting material preferably asbestos also secured to those members by bolts 5. A canopy shaped member 8 is also secured within the heater to bottom 1 and forms a gas conducting chamber 9 with the bottom 1 and an air chamber 10 with the walls and top.

Member 8 preferably comprises a continuous piece of metal and forms a gas tight connection with bottom 1.

Bottom 1 is further provided with apertures 11 through which project the ends of pipe 12 and 13, the latter being secured in place by flanges 14 having grip bolts 15. Within chamber 9 and also secured to bottom 1 by bolts 16 are baffles 17 which are provided with apertures 18.

Pipes 12 and 13 are connected to the exhaust pipe of the automobile and lead the hot gases into and out of the heater, which gases in passing around and through baffles 17 give out heat which is conducted through member 8. Chamber 10 thus becomes charged with warm air which circulates out through top apertures 6 and heats the surrounding space. As will readily be seen, the heater occupies but small space and can be readily installed on the floor of an automobile or other convenient and out of the way place. The heat being supplied from the engine exhaust gases, there is greater efficiency and no cost of operation and the simplicity of construction results in an economical heater, which permits inexpensive manufacture.

It will be understood that changes and modifications may be made without departing from the spirit of the invention.

What I claim is:

1. In a device of the class specified, the combination of an elongated base member, a cover member forming a heating chamber, heat resisting material on said base member, apertures in said base member adjacent the ends thereof, pipes secured in said apertures, baffles in said chamber, said baffles being secured to said base member and extending transversely of said chamber, said baffles having apertures therein, wall members secured to said base member and having heat resisting material on the inner sides thereof, and an apertured top member secured to and forming a radiation chamber with said wall members.

2. In a device of the class specified, a shell or casing forming an elongated heating chamber having a gas inlet and outlet, baffles arranged transversely of said heating chamber between the inlet and outlet, said baffles being extended to the bottom of the casing at their lower ends and terminated below the top of the casing at their upper ends, so as to form a heating passage immediately below the top of the shell or casing.

3. In a device of the class specified, a shell or casing forming an elongated heating chamber having a gas inlet and outlet, baffles arranged transversely of said heating chamber between the inlet and outlet, said baffles being extended to the bottom of the casing at their lower ends and terminated below the top of the casing at their upper ends so as to form a heating passage immediately below the top of the shell or casing, said baffles having apertures for permitting part of said gas to pass through and heat said baffles.

4. In a device of the class specified, a shell or casing forming an elongated horizontally arranged heating chamber having a gas inlet and a gas outlet, said shell or casing containing vertically arranged baffles whose sides are spaced from the sides of the shell or casing, so as to form heating passages between said baffles and the sides of the shell or casing.

5. In a device of the class specified a shell or casing forming an elongated heating chamber provided with a gas inlet and a gas outlet, said shell or casing containing transversely arranged baffles located between the gas inlet and outlet and all having their upper ends spaced from the top of the shell or casing to form a heating passage between said baffle upper ends and said shell or casing top.

6. In a device of the class specified, a shell or casing forming an elongated heating chamber having a gas inlet and a gas outlet, said shell or casing containing baffles all of whose upper edges are below the top of the shell or casing so as to form a heating passage between said baffles and said shell or casing top, said baffles being provided with apertures.

7. In a device of the class specified a shell or casing forming an elongated heating chamber having a gas inlet and a gas outlet, said heating chamber containing transversely arranged baffles between the inlet and outlet, said baffles having their upper edges spaced from the top of the shell or casing and their side edges spaced from the side walls of the casing.

8. In a device of the class specified a shell or casing forming an elongated heating chamber having a gas inlet and a gas outlet, said heating chamber containing transversely arranged baffles between the inlet and outlet, said baffles having their upper edges spaced from the top of the shell or casing and their side edges spaced from the side walls of the same and being provided with apertures.

9. In a device of the class specified, the combination of an elongated shell or casing forming a heating chamber and having a gas inlet and a gas outlet and transversely arranged baffles located in said shell or casing and mounted on the floor thereof, said baffles having their sides spaced from the sides of the shell or casing and their tops spaced from the top of the casing.

10. In a device of the class specified, the combination of an elongated shell or casing forming a heating chamber and having a gas inlet and a gas outlet and transversely arranged baffles located in said shell or casing and mounted on the floor thereof, said baffles having their sides spaced from the sides of the shell or casing and their tops spaced from the top of the same and being provided with apertures.

In witness whereof, I have hereunto subscribed my name this seventh day of December, A. D. 1926.

PAUL F. VICTOR.